United States Patent
Howell et al.

[19]

[11] Patent Number: 6,023,411
[45] Date of Patent: Feb. 8, 2000

[54] MODULAR DOCKING TRAY AND METHOD

[75] Inventors: Bryan Howell, Austin, Tex.; John W. Lai, San Francisco, Calif.; Bryan Hunter, Meridian, Id.; Peter Skilman, San Carlos, Calif.; Steve Gluskoter, Austin, Tex.

[73] Assignee: Dell U.S.A., L.P., Round Rock, Tex.

[21] Appl. No.: 09/014,183

[22] Filed: Jan. 27, 1998

[51] Int. Cl.[7] .................................. G06F 1/16; H05K 7/10
[52] U.S. Cl. .............................................. 361/686; 439/374
[58] Field of Search ..................................... 361/679, 683, 361/684, 685, 686, 731, 737, 741, 756, 759, 802; 439/374, 366

[56] References Cited

U.S. PATENT DOCUMENTS

| | | | |
|---|---|---|---|
| D. 354,277 | 1/1995 | Kuzumoto et al. . | |
| 5,126,954 | 6/1992 | Morita | 364/708 |
| 5,227,953 | 7/1993 | Lindberg et al. | 361/393 |
| 5,436,792 | 7/1995 | Leman et al. . | |
| 5,477,415 | 12/1995 | Mitcham et al. . | |
| 5,491,609 | 2/1996 | Dankman et al. | 361/686 |
| 5,535,093 | 7/1996 | Noguchi et al. | 361/686 |
| 5,568,359 | 10/1996 | Cavello et al. | 361/686 |
| 5,604,663 | 2/1997 | Shin et al. | 361/686 |
| 5,694,292 | 12/1997 | Paulsel et al. | 361/686 |
| 5,699,226 | 12/1997 | Cavello | 361/686 |
| 5,745,341 | 4/1998 | Wolff et al. | 361/682 |
| 5,805,412 | 9/1998 | Yanagisawa et al. | 361/686 |
| 5,847,924 | 12/1998 | Youn | 361/686 |
| 5,875,094 | 2/1999 | Kirkendoll | 361/686 |
| 5,882,220 | 3/1999 | Horii et al. | 439/297 |

FOREIGN PATENT DOCUMENTS 406202760  7/1994  Japan .................. G06F 1/16

*Primary Examiner*—Benjamin R. Fuller
*Attorney, Agent, or Firm*—Haynes & Boone, L.L.P.

[57] ABSTRACT

A docking tray includes first guides for receiving a first docking device of a first size and second guides for receiving a second docking device of a second size. Contacts are provided adjacent the first and second guides. A display and control area is provided on the tray, remote from the guides, and is electrically connected to the contacts. The first and second docking devices each have contacts which matingly engage the tray contacts to provide communication with the display and control area. Grip members are formed on opposite sides of the tray and extend inwardly into the tray. The tray has a low profile and includes a surface having a tilt angle of less than two degrees.

20 Claims, 5 Drawing Sheets

MODULAR DOCKING TRAY AND METHOD

BACKGROUND

The disclosures herein relate generally to portable computers and more particularly to a modular docking tray which can accommodate various size docking devices.

Various docking devices have been developed for use with portable notebook computers. In one application, the main electronic housing of the docking station is pivotably mounted with a receiving tray to provide a number of positions for the notepad computer between an upright position and a low angle position. The upright positions are useful when using the internal display of the notepad computer, particularly if an external keyboard and pointing device are used. The low angle position is useful when an external monitor is used and the overlay of the notepad computer is used for input. The receiving tray is removably mounted to the docking station and may be replaced with another receiving tray of a different size for use with a different notepad computer of a different size.

In another application, an automatic docking station for a portable computer such as a notebook or laptop is provided wherein the station includes a housing with external connectors to connect up to a full size monitor and full size keyboard as well as external connectors for connection to a modem and a mouse. The docking station further includes internal connectors coupled to these external connectors and tray for receiving the portable computer. The docking station includes a first drive motor to drive the tray into and out of the docking station so that some of the internal connectors engage and disengage with connectors on the end of the portable computer mounted on the tray. The movement of the tray causes an internal connector mounted on a first side of the docking station to cam into and out of engagement with a connector on a first side of the portable computer mounted on the tray. A second drive motor is provided to drive other internal connectors mounted on a second side of the docking station into and out of engagement with connectors on a second side of the portable computer mounted on the tray. Guide pins which are locked and unlocked in response to the guide pins being in mating holes in the portable computer are provided.

The present notebook computer market requires that docking devices such as port replicators and docking stations be offered with each notebook model. Typically, each notebook model has a single one piece docking device that matches the physical characteristics of that particular notebook computer. Thus, the user is locked into purchasing a single use mode, non-modular docking solution. This arrangement offers no flexibility in allowing the user to configure docking devices to meet individual requirements.

Docking tray heights are usually provided such that when the notebook computer is mounted on the tray, the keyboard is substantially raised above the desk or table support surface on which the tray rests. In addition, the tray is made so that a significant amount of tilt is introduced to the keyboard in a manner which is uncomfortable and unnecessary.

Notebook computers are sometimes difficult to engage with the docking device. This is due to the engagement of the computer connector and the docking connector. The force required to engage these connectors is substantial. Typically, the user pushes the notebook computer with force applied through the thumbs urging the computer toward the docking device while hand gripping the tray because there is a need to produce opposing forces between the computer and tray, otherwise the tray and device may shift away from the computer as the force is applied to the computer.

Some uses require docking of the notebook computer to the docking device, combined with adding a monitor stand above the computer so as to support a standard monitor. An external keyboard is then connected to the notebook along with the monitor. In this operating mode, user friendly information LED's and function oriented buttons, e.g. power buttons, provided on the notebook computer are neither reachable nor visible to the user.

Therefore, what is needed is a docking tray that will accommodate various size docking devices, which has an easily viewable control and display area remote from the docking area, which has a grip advantage to assist in engaging the computer with the docking device, and which is ergonomically enhanced.

SUMMARY

One embodiment accordingly, provides a docking tray which accommodates various docking devices, and enhances user docking, monitoring and comfort. To this end, a docking tray includes first and second guides for receiving first and second size docking devices. Contacts are provided adjacent the guides. A display and control area are provided on the tray, remote from the guides, and electrically connected to the contacts.

A principal advantage of this embodiment that one tray can be used to accommodate various docking devices. A display and control area is easily visible to the user. Docking of a portable computer with one of the various docking devices is facilitated by grip areas formed in the tray, and user comfort is enhanced by ergonomic advantages built into the tray.

DETAILED DESCRIPTION OF THE PREFERRED EMBODIMENT

Figure 1:
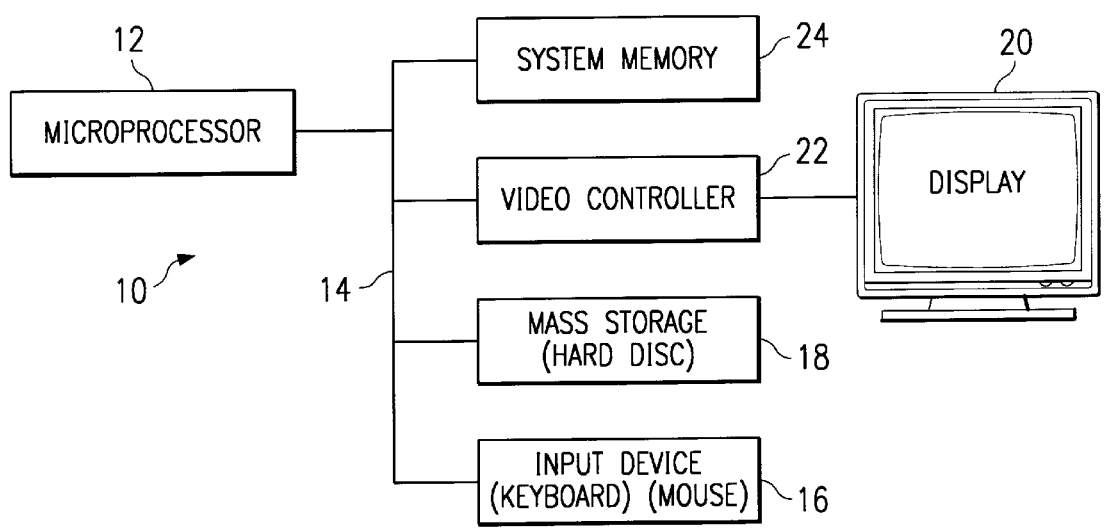
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
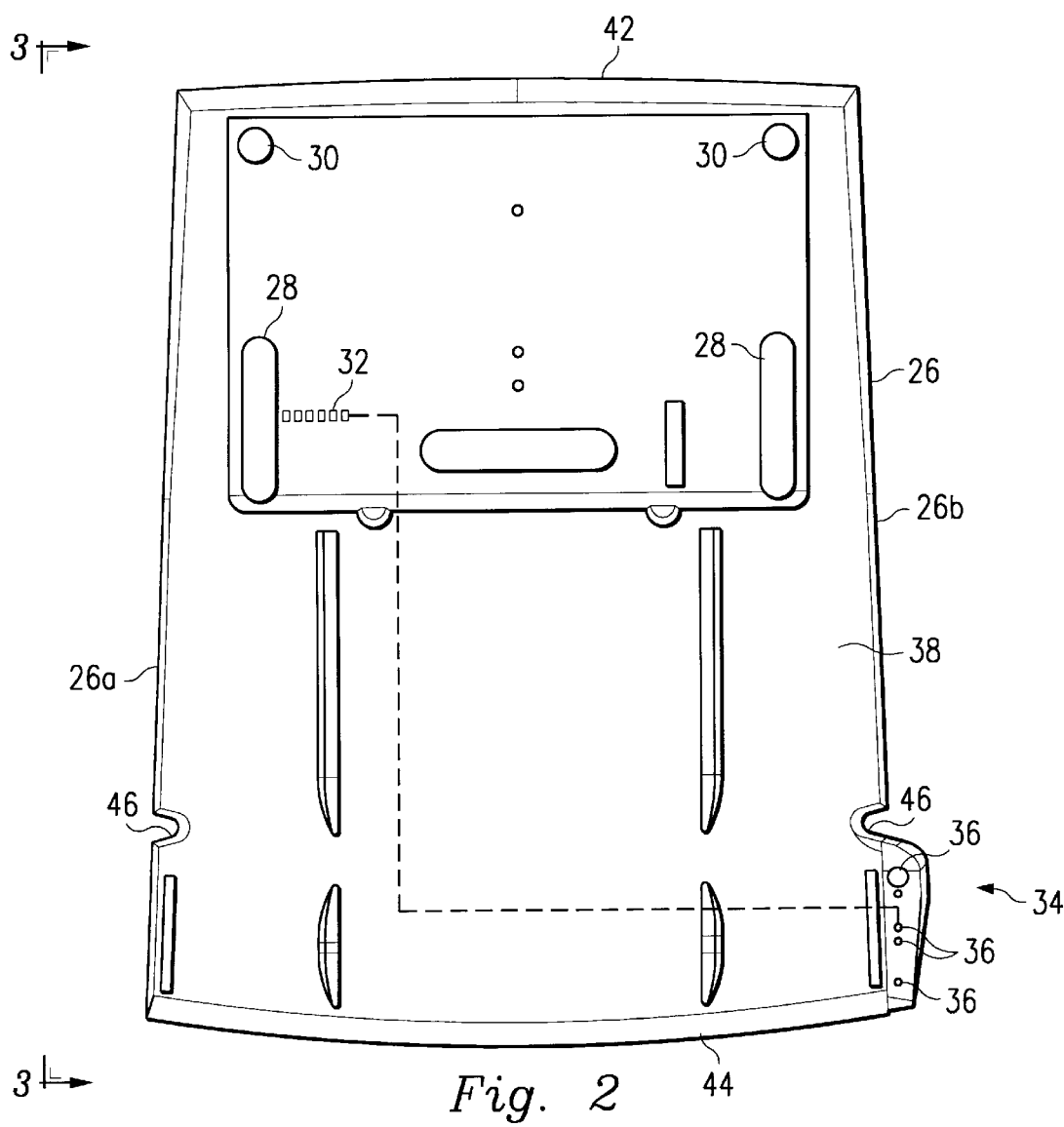
FIG. 2 is a top plan view illustrating an embodiment of a docking tray.

A docking tray 26, FIG. 2, is provided for use with computer system 10. The tray 26 includes a pair of slotted first guides 28 for receiving a first docking device of a first size, e.g. a port replicator (discussed below). The tray 26 also includes a pair of second guides 30 for receiving a second docking device of a second size, different from the first size, e.g. a docking station (discussed below). Contacts 32 are provided adjacent the first and second guides 28, 30, respectively. A display and control area 34 is provided on the tray 26 remote from the first and second guides 28, 30, respectively. The display and control area 34 includes elements 36 electrically connected to the contacts 32 in a suitable manner.

Figure 3:
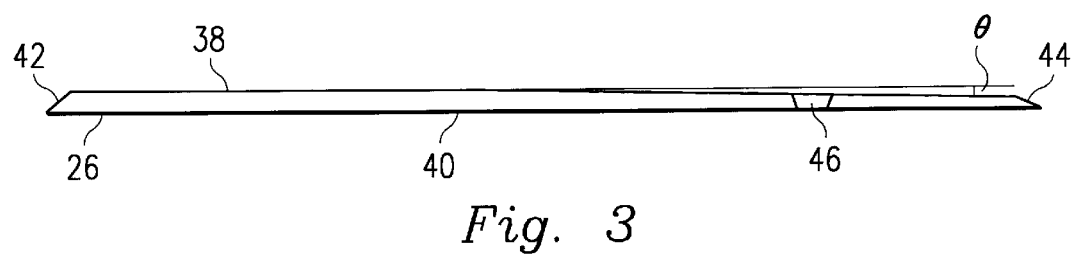
FIG. 3 is a side view taken along the line 3—3 of FIG. 2.

The tray 26, FIG. 3 has a low profile and includes a surface 38 having a tilt angle $\ominus$ of less than two degrees (2°) from a horizontal support surface 40. The first guides 28, FIG. 2, and the second guides 30, are formed in the surface 38 of the tray 26 and are positioned adjacent a first end 42 of the tray 26. The display and control area 34 is positioned adjacent a second end 44 of the tray 26 opposite the first end 42. A pair of grip members 46 are formed in opposite sides of the tray 26. The grip members 46 are positioned adjacent the second end 44 of the tray 26 as is the display and control area 34.

Figure 7:
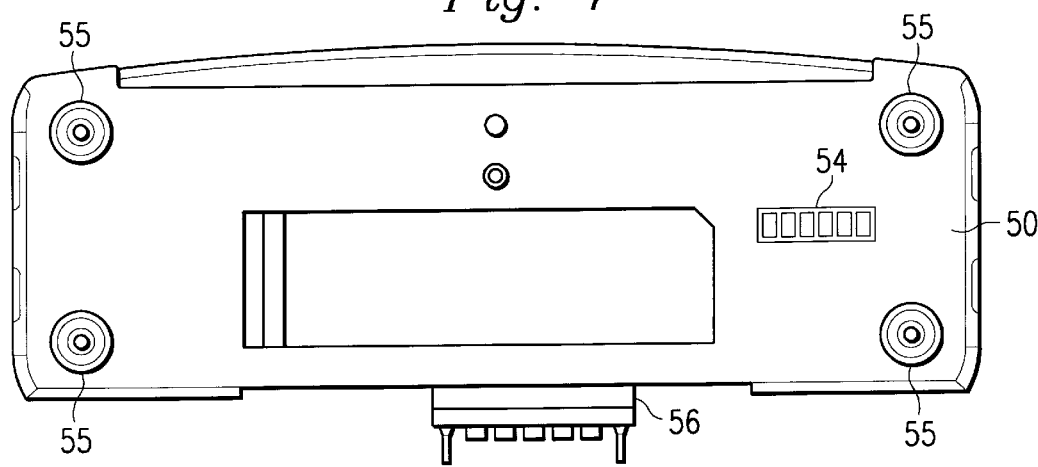
FIG. 7 is a bottom plan view illustrating an embodiment of the first docking device.
Figure 9:
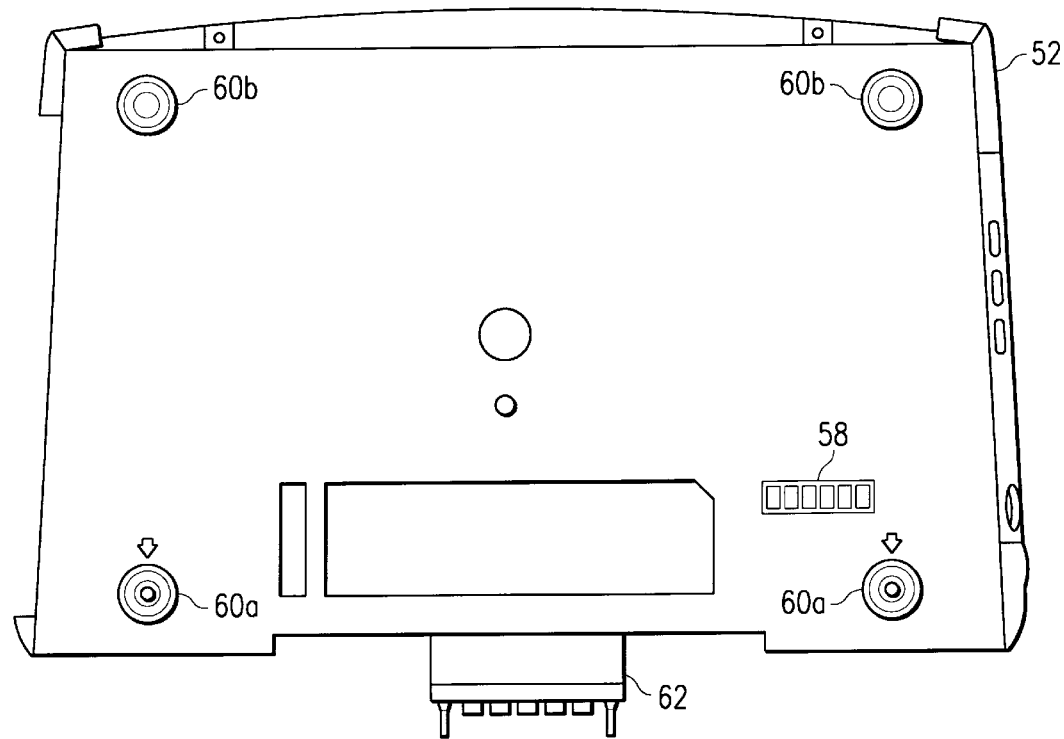
FIG. 9 is a bottom plan view illustrating an embodiment of the second docking device.

Docking tray 26, FIG. 2 is generally rectangular and includes the recessed guides 28, 30 adjacent the first end 42. Grip members 46, which are slots or indentations in opposite sides 26a, 26b of tray 26, are adjacent the second end 44. Control area 34 is also adjacent the second end 44. The first end 42 has a slightly narrower width than the second end 44 as viewed in FIG. 2. Contacts 32 are positioned adjacent the guides 28, 30 so as to engage mating contacts, 54, 58 on either of the docking devices 50, 52, respectively, which are seated in the guides 28, 30 (see also, FIGS. 7 and 9). Sides 26a, 26b and ends 42, 44 of tray 26 are esthetically tapered, and the low profile surface 38 of the tray 26 inclines gradually from end 44 to end 42. The slotted shape of guides 28 provides a built-in accommodation for variations in the spacing between feet 55 of docking device 50 and between feet 60a, 60b of docking device 52.

As a result of the foregoing, the docking tray 26 is provided with guides 28 for receiving docking device 50. Tray 26 is also provided with guides 30 which, along with guides 28, receive docking device 52. The contacts 32 provided on surface 38 of tray 26 are positioned to engage contacts 54 of docking device 50 or contacts 58 of docking device 52. The display and control area 34 is electrically connected to the contacts 32 and is also remote from the guides 28, 30 which seat docking devices 50 and 52.

The useful grip areas are slotted into tray 26 and the surface 38 is inclined only slightly at a tilt angle of less than two degrees from horizontal when tray 26 is resting on a horizontal surface. The enlarged area of surface 38 of tray 26 provides ample space for either of the docking devices 50, 52 to be positioned adjacent end 42, whereas a docked notebook computer is positioned on tray 26 adjacent end 44. The position of the display and control area 34 adjacent end 44 places the area 34 in proximity to the position of a user. Similarly, grip areas 46 are in proximity to a user.

Figure 4:
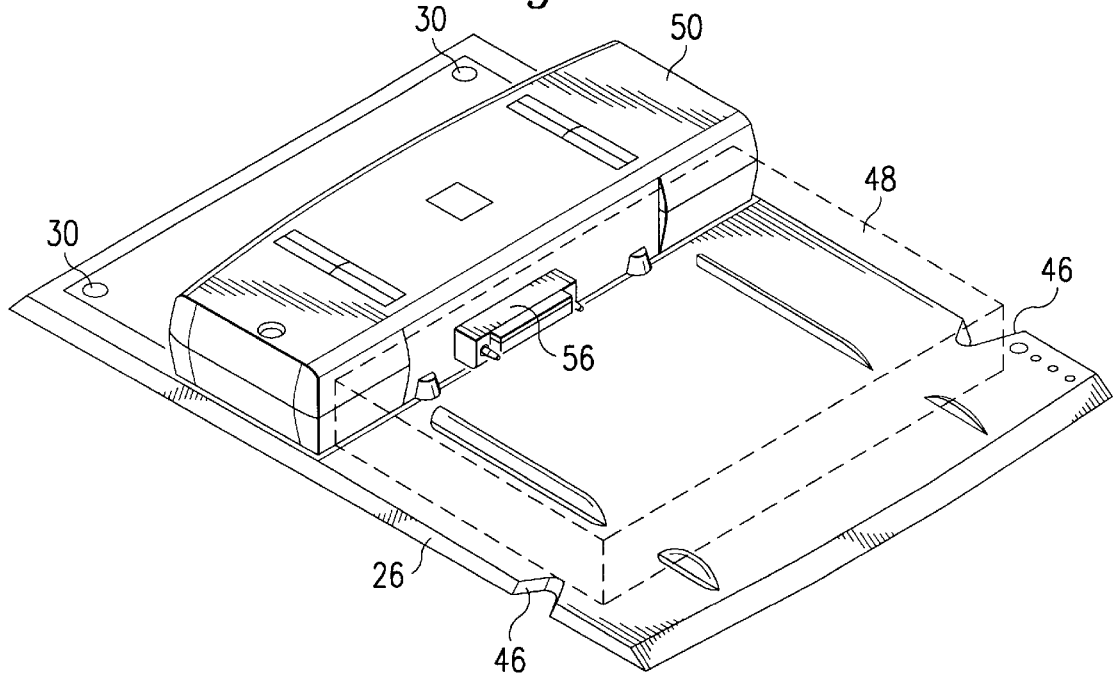
FIG. 4 is an isometric view illustrating an embodiment of the docking tray and a first docking device docked with a portable computer illustrated in phantom.
Figure 5:
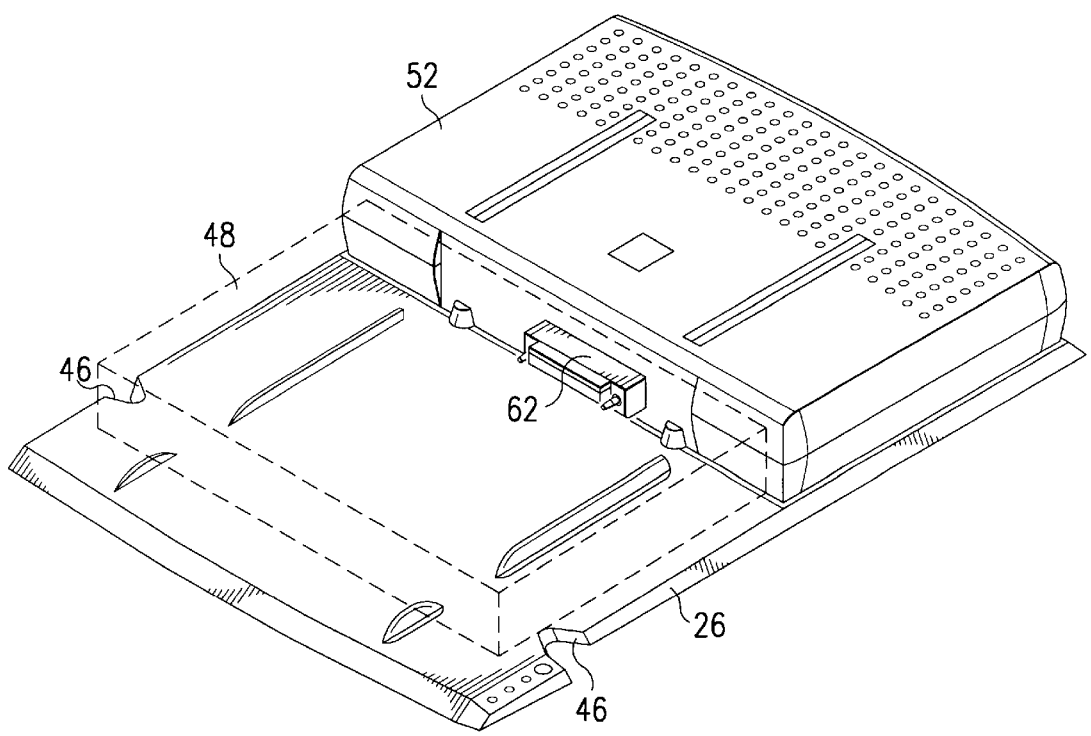
FIG. 5 is an isometric view illustrating an embodiment of the docking tray and a second docking device docked with the portable computer illustrated in phantom.
Figure 6:
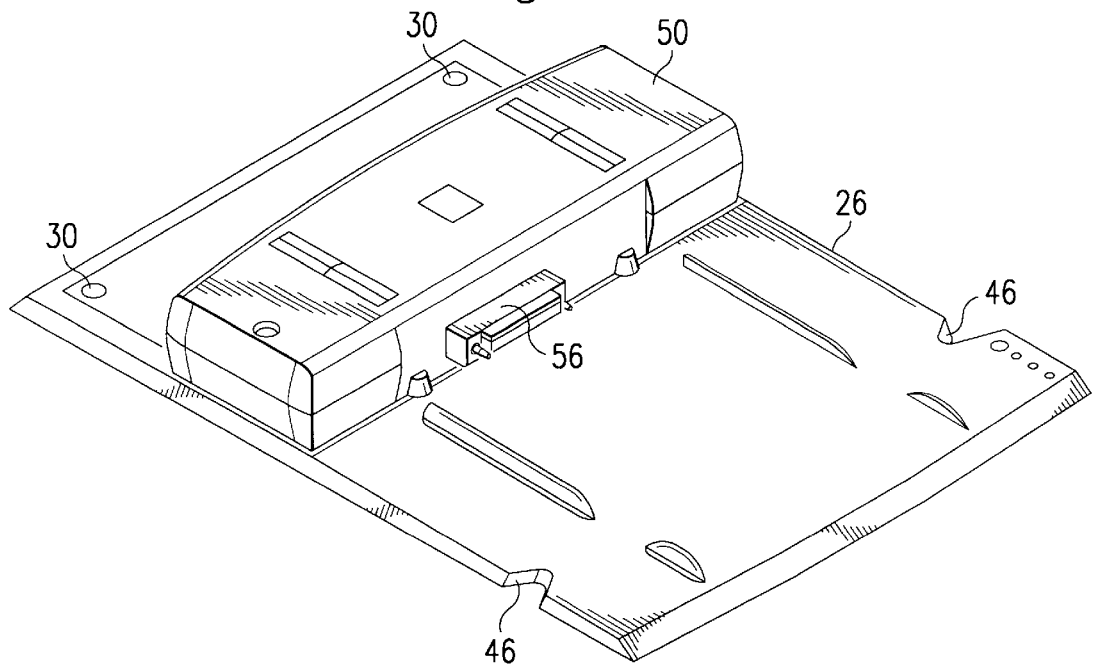
FIG. 6 is an isometric view illustrating an embodiment of the docking tray and the first docking device.

In operation, a portable computer 48, FIGS. 4 and 5, including system 10, may be mounted on the tray 26 and docked with either the first or the second docking device 50, 52, respectively. The first docking device 50, FIG. 6, can be mounted on the first guides 28 of the tray 26, FIG. 2. The first docking device 50, FIG. 7, includes contacts 54 for engagement with the tray contacts 32, and the plurality of feet 55 which seat in first guides 28. The portable computer 48, FIG. 4, is docked with the first docking device 50 by placing the computer 48 on the tray 26, gripping the grip members 46 and then urging the computer 48 toward and into engagement with the first docking device 50. In this manner, a well-known connector (not shown) on the computer 48, engages a well-known connector 56, on the first docking device 50.

Figure 8:
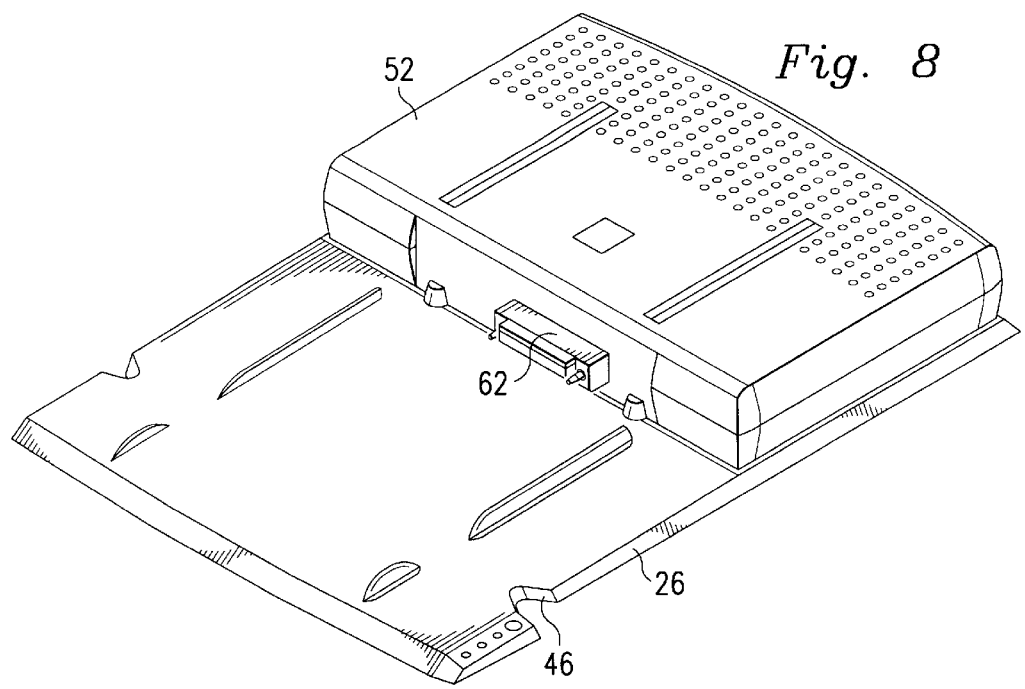
FIG. 8 is an isometric view illustrating an embodiment of the docking tray and the second docking device.

The first docking device 50 can be removed and replaced with the second docking device 52, FIG. 8, mounted on the first and second guides 28, 30 of the tray 26, FIG. 2. The second docking device 52, FIG. 9, includes contacts 58 for engagement with the tray contacts 32, and the plurality of feet 60a, 60b, two of which, 60a, seat in first guides 28 and two of which 60b, seat in second guides 30. The portable computer 48, FIG. 5 is docked with the second docking device 52 by placing the computer 48 on the tray 26, gripping the grip members 46 and then urging the computer 48 toward and into engagement with the second docking device 52. In this manner, a well-known connector (not shown) on the computer 48, engages a well-known connector 62 on the second docking device 52.

As it can be seen, the principal advantages of these embodiments are that an elongated tray can be used to accommodate various docking devices. A display and control area is easily visible to the user when a monitor stand is used with the tray. Docking of a portable computer with either a port replicator or a docking station is possible. Grip areas are formed in the tray as indentations for the users fingers to grip and pull forward while the users thumbs simultaneously push back on the notebook computer. A low tray profile and negligible tilt angle enhance user comfort.

After docking of the computer with either the first or second docking device, a monitor stand may be placed adjacent the tray. The monitor stand is positioned above the notebook computer and the computer lid or cover is closed. A monitor is placed on the monitor stand and a keyboard is positioned in front of the tray adjacent the display and control area. The monitor and keyboard are cable connected to the docking device. Because of the interconnection of the docking device with the portable computer, the monitor and the keyboard, and because of the engagement of the docking device contacts and the tray contacts, the display and control area can be used to reference and control computer functions which are otherwise unavailable because the cover of the notebook computer is closed as stated above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A docking tray comprising:

a first tray portion for receiving a plurality of various size docking devices;

a second tray portion for receiving a portable computer;

first guides in the first tray portion for receiving a first docking device of a first size;

second guides in the first tray portion for receiving a second docking device of a second size, different from said first size;

contacts adjacent the first and second guides;

a display and control area in the second portion of the tray, remote from the first portion and electrically connected to the contacts; and grip members formed on opposite sides of the second portion of the tray.

2. The docking tray as defined in claim 1, wherein the grip members extend inwardly into the tray.

3. The docking tray as defined in claim 2 wherein the tray has a low profile and includes a surface having a tilt angle of less than two degrees from horizontal.

4. The docking tray as defined in claim 3 wherein the grip members are positioned adjacent the display and control area.

5. The docking tray as defined in claim 3 wherein the first and second guides are positioned adjacent a first end of the tray and the display and control area is positioned adjacent a second end of the tray, opposite the first end.

6. The docking tray as defined in claim 3 wherein the first and second guides are positioned adjacent a first end of the tray, and the display and control area and the grip members are positioned adjacent the second end.

7. The docking tray as defined in claim 2 wherein the first guides are positioned adjacent a first end of the tray.

8. The docking tray as defined in claim 7 wherein the second guides are positioned adjacent a first end of the tray.

9. The docking tray as defined in claim 8 wherein the display and control area is positioned adjacent a second end of the tray, opposite the first end.

10. A computer system comprising:

a portable computer including a microprocessor;

an input coupled to provide input to the microprocessor;

a mass storage coupled to the microprocessor;

a display coupled to the microprocessor by a video controller;

a memory coupled to provide storage to facilitate execution of computer programs by the microprocessor;

a docking tray;

first guides on the tray for receiving a first docking device of a first size;

second guides on the tray for receiving a second docking device of a second size, different from said first size;

the portable computer mounted on the tray in docked engagement with one of the first and second docking devices;

contacts adjacent the first and second guides; and a display and control area on the tray, remote from the first and second guides, and electrically connected to the contacts.

11. The computer system as defined in claim 10 wherein the tray has a low profile and includes a surface having a tilt angle of less than two degrees from horizontal.

12. The computer as defined in claim 11 wherein the grip members are positioned adjacent the display and control area.

13. The computer as defined in claim 11 wherein the first and second guides are positioned adjacent a first end of the tray and the display and control area is positioned adjacent a second end of the tray, opposite the first end.

14. The computer as defined in claim 11 wherein the first and second guides are positioned adjacent a first end of the tray, and the display and control area and the grip members are positioned adjacent the second end.

15. The computer system as defined in claim 10 further comprising grip members formed in opposite sides of the tray, the grip members extending inwardly into the tray.

16. The computer as defined in claim 15 wherein the first guides are positioned adjacent a first end of the tray.

17. The computer as defined in claim 16 wherein the second guides are positioned adjacent a first end of the tray.

18. The computer as defined in claim 17 wherein the display and control area is positioned adjacent a second end of the tray, opposite the first end.

19. A method of mounting various docking devices on a modular docking tray comprising the steps of:

providing a first tray portion for receiving a plurality of docking devices;

providing a second tray portion for receiving a portable computer;

forming first guides on the first portion of the tray for receiving a first docking device of a first size;

forming second guides on the first portion of the tray for receiving a second docking device of a second size, different from said first size;

positioning tray contacts adjacent the first and second guides;

mounting the first docking device on the first guides, the first docking device having first docking contacts for engagement with the tray contacts;

removing the first docking device;

mounting the second docking device on the second guides, the second docking device having second docking contacts for engagement with the tray contacts;

providing a display and control area on the tray remote from the tray contacts and electrically connected thereto for communicating input between the display and control area and one of the first and second docking devices; and forming grip members on the second tray portion.

20. The method as defined in claim 19 wherein the step of forming grip members on opposite sides of the tray, includes the step of extending the grip members inwardly into the tray.

* * * * *